(12) United States Patent
Miyawaki

(10) Patent No.: US 11,774,805 B2
(45) Date of Patent: Oct. 3, 2023

(54) ELECTROOPTIC APPARATUS AND ELECTRONIC APPARATUS

(71) Applicant: SEIKO EPSON CORPORATION, Tokyo (JP)

(72) Inventor: Daisuke Miyawaki, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/725,565

(22) Filed: Apr. 21, 2022

(65) Prior Publication Data

US 2022/0342244 A1 Oct. 27, 2022

(30) Foreign Application Priority Data

Apr. 22, 2021 (JP) ................. 2021-072402

(51) Int. Cl.

| | |
|---|---|
| *G02F 1/1368* | (2006.01) |
| *G02F 1/1339* | (2006.01) |
| *G02F 1/1343* | (2006.01) |
| *G02F 1/1337* | (2006.01) |
| *C08J 5/18* | (2006.01) |
| *G02F 1/1362* | (2006.01) |

(52) U.S. Cl.
CPC .............. *G02F 1/1339* (2013.01); *C08J 5/18* (2013.01); *G02F 1/1368* (2013.01); *G02F 1/13378* (2013.01); *G02F 1/13439* (2013.01); *G02F 1/133719* (2013.01); *G02F 1/134309* (2013.01); *G02F 1/136286* (2013.01); *C08J 2383/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0055529 | A1* | 3/2008 | Shirasaka | G02F 1/1343 |
| | | | | 349/143 |
| 2011/0177342 | A1* | 7/2011 | Itoh | C08J 7/043 |
| | | | | 427/527 |
| 2012/0249919 | A1* | 10/2012 | Yokota | G02F 1/1335 |
| | | | | 349/61 |
| 2015/0103284 | A1* | 4/2015 | Nagasawa | G02F 1/134336 |
| | | | | 349/46 |
| 2016/0253973 | A1* | 9/2016 | Nishida | G09G 3/3655 |
| | | | | 345/209 |
| 2020/0241355 | A1* | 7/2020 | Chang | G02F 1/133512 |
| 2022/0320046 | A1* | 10/2022 | Chang | H01L 25/0652 |

FOREIGN PATENT DOCUMENTS

| | | | | |
|---|---|---|---|---|
| CN | 102736328 | | 10/2012 | |
| JP | H01293317 | | 11/1989 | |
| JP | 2008058497 | | 3/2008 | |
| JP | 2013-072932 | * | 4/2013 | .......... G02F 1/1343 |
| JP | 2013072932 | * | 4/2013 | .......... G02F 1/1343 |

(Continued)

*Primary Examiner* — Sang V Nguyen
(74) *Attorney, Agent, or Firm* — JCIPRNET

(57) ABSTRACT

A liquid crystal apparatus includes a first pixel electrode in a display region, and a second pixel electrode and a circuit such as a scan line driving circuit outside the display region. A TFT provided corresponding to the second pixel electrode is separated from the circuit, and the second pixel electrode extends to the region that overlaps the circuit.

11 Claims, 8 Drawing Sheets

(56) References Cited

FOREIGN PATENT DOCUMENTS

| JP | 2015114375 | | 6/2015 | | |
|---|---|---|---|---|---|
| JP | 2017040847 | * | 2/2017 | ........... | G02F 1/1337 |
| JP | 2019002989 | | 1/2019 | | |
| JP | 2020-201397 | * | 12/2020 | ........... | G02F 1/1337 |
| JP | 2020201397 | * | 12/2020 | ........... | G02F 1/1337 |

* cited by examiner

ELECTROOPTIC APPARATUS AND ELECTRONIC APPARATUS

The present application is based on, and claims priority from JP Application Serial Number 2021-072402, filed Apr. 22, 2021, the disclosure of which is hereby incorporated by reference herein in its entirety.

BACKGROUND

1. Technical Field

The present disclosure relates to an electrooptic apparatus and an electronic apparatus.

2. Related Art

In the related art, a projector using an electrooptic apparatus such as a liquid crystal apparatus as a light modulation apparatus has been known. In such a projector, the density of the light flux incident on the liquid crystal apparatus is larger than in a direct-view liquid crystal apparatus. Consequently, ionic impurities originating from the sealing material and the like are easily eluted to the liquid crystal layer of the liquid crystal apparatus. The ionic impurities can retain in the liquid crystal layer, and induce disturbance in the alignment of the liquid crystal and reduction in the driving speed and the voltage retention rate, thus leading to reduction in the display quality of the liquid crystal apparatus.

For example, JP-A-2020-201397 discloses an electrooptic apparatus including a dummy pixel region and an ion trap electrode that captures ionic impurities, outside the display region. In addition, JP-A-1-293317 discloses a liquid crystal image display apparatus including a dummy pixel group between a displaying pixel group and a sealing material.

However, in the electrooptic apparatus disclosed in JP-A-2020-201397, stain-like display defects easily occur at a corner of the display region. Specifically, the width of the dummy pixel region cannot be sufficiently ensured, and when the display region and the ion trap electrode are close to each other, the ionic impurities induced to the ion trap electrode protrude into the display region in some situation. In view of this, as with the liquid crystal image display apparatus disclosed in JP-A-1-293317, it is conceivable to dispose the dummy pixel group in a wide range outside the display region. However, each dummy pixel in the dummy pixel group requires a driving switching element, and as such it is difficult to dispose the peripheral circuits for driving and inspection and the dummy pixel group in an overlapping manner between the display region and the sealing material in plan view. That is, electrooptic apparatuses that suppress the occurrence of defects originating from ionic impurities are desired.

SUMMARY

An electrooptic apparatus includes a first pixel electrode provided in a display region, and a second pixel electrode, a transistor provided corresponding to the second pixel electrode, and a circuit separated from the transistor, the second pixel electrode, the transistor and the circuit being provided outside the display region. The second pixel electrode overlaps the circuit in plan view.

An electronic apparatus includes the above-described electrooptic apparatus.

BRIEF DESCRIPTION OF THE DRAWINGS

FIG. 5 is a schematic plan view illustrating an arrangement of a first pixel electrode, a second pixel electrode and the like.

DESCRIPTION OF EXEMPLARY EMBODIMENTS

In the following drawings, the XYZ axes are set as mutually orthogonal coordinate axes as necessary. The direction pointed by each arrow is the + direction, and the direction opposite to the + direction is the − direction. In some cases, the +Z direction and the −Z direction are referred to as upward and downward, respectively, and a view from the +Z direction is referred to as plan view or plan. In addition, to illustrate each layer and each member in recognizable sizes, each layer and each member are not drawn to scale.

Note that the thickness of the structure such as a film and a layer provided on the substrate is the distance in the direction along the Z axis, which is the normal direction of the substrate.

1. First Embodiment

In this embodiment, a liquid crystal apparatus of an active drive type including a thin film transistor (TFT) is exemplified as an electrooptic apparatus. A configuration of a liquid crystal apparatus 100 as an electrooptic apparatus according to this embodiment is described with reference to FIGS. 1 to 3. FIG. 2 illustrates a cross section along the YZ plane, including the line H-H' of FIG. 1. In FIG. 2, for the sake of convenience of illustration, the size and number of the liquid crystals included in the liquid crystal layer are different from the actual size and number, and the illustration of the inspection circuit and wiring described later is omitted.

Figure 1:
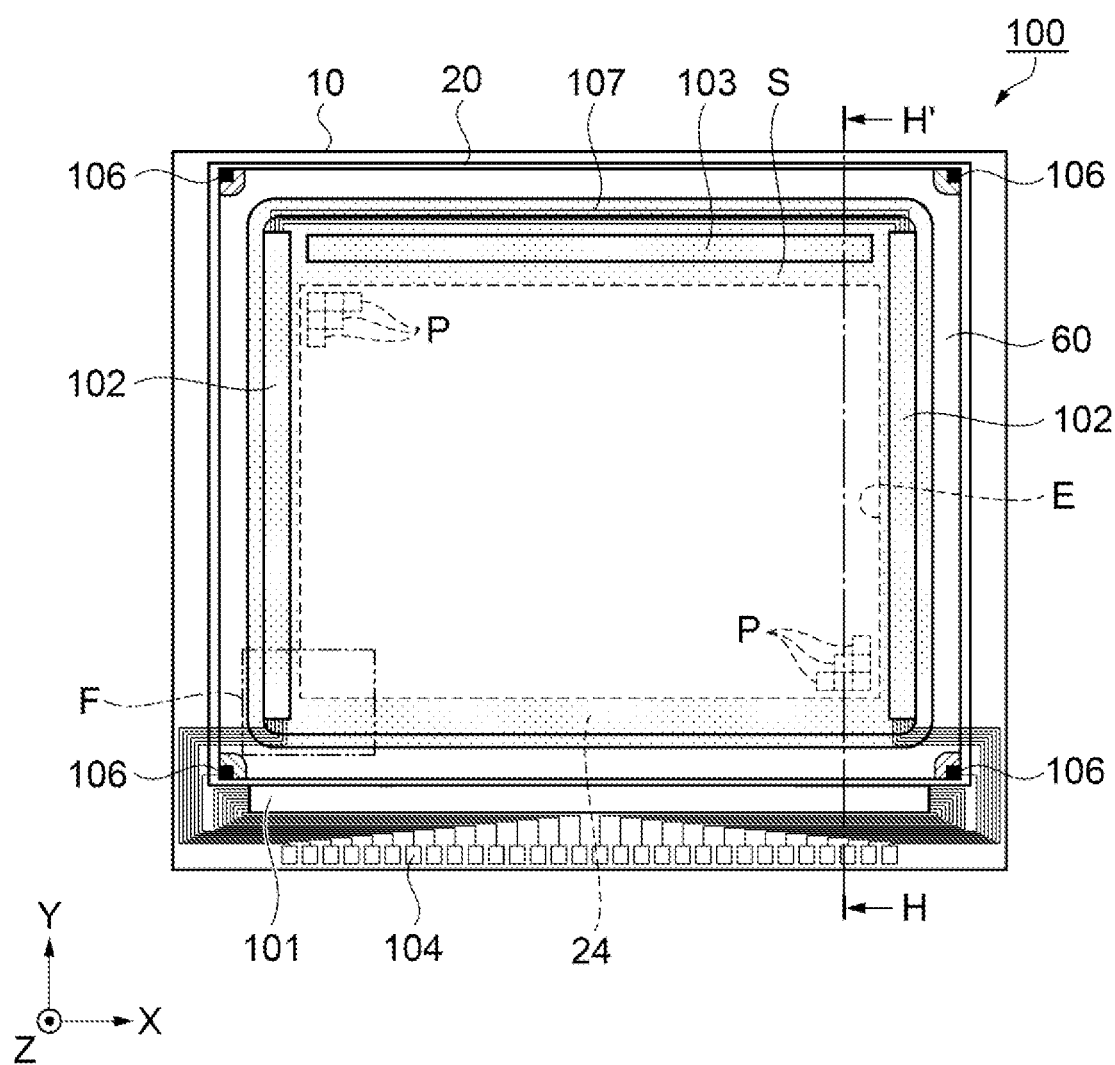
FIG. 1 is a schematic plan view illustrating a configuration of a liquid crystal apparatus as an electrooptic apparatus according to a first embodiment.
Figure 2:
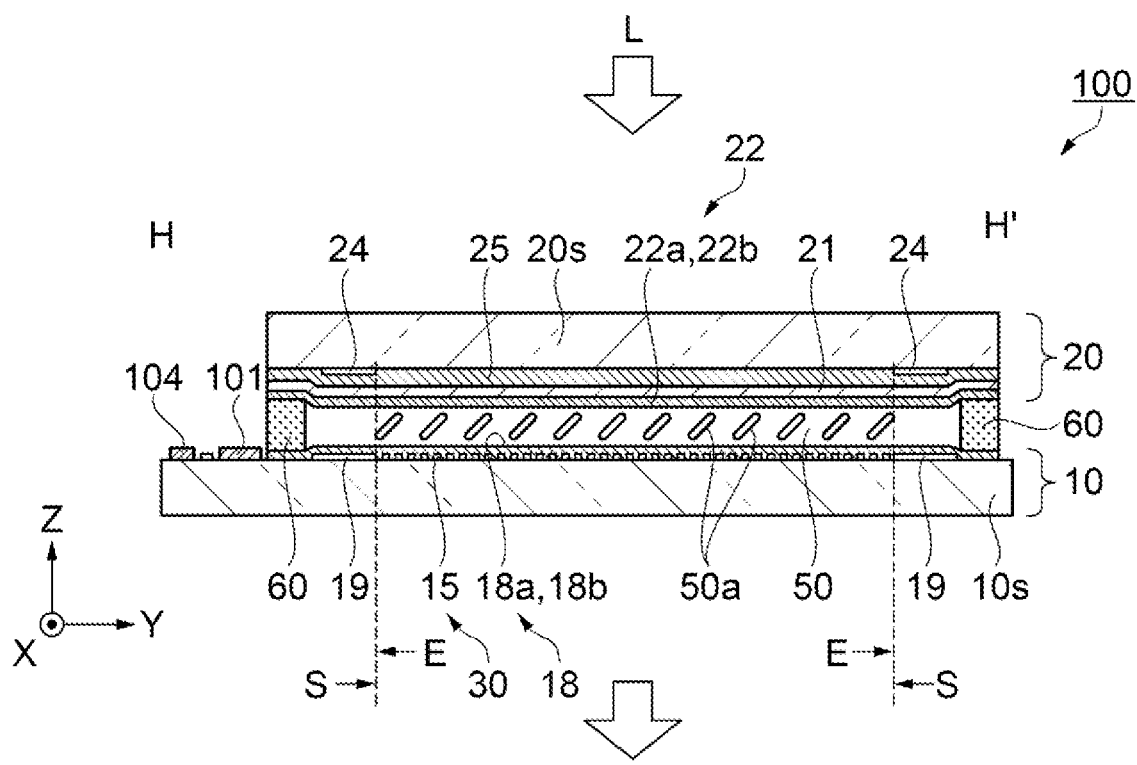
FIG. 2 is a schematic sectional view illustrating a configuration of the liquid crystal apparatus.

As illustrated in FIG. 1, the liquid crystal apparatus 100 includes an element substrate 10, an opposed substrate 20, and a liquid crystal layer not illustrated in the drawing. The element substrate 10 and the opposed substrate 20 are substantially rectangular in plan view. The element substrate 10 and the opposed substrate 20 are stacked and joined through a sealing material 60 disposed along the outer edge of the opposed substrate 20. A display region E including a plurality of pixels P is provided inside the sealing material 60. The display region E has a substantially rectangular outer periphery with a pair of long sides along the X axis and a pair of short sides along the Y axis. The plurality of pixels P are disposed in a matrix in the directions along the X axis and the Y axis.

The sealing material 60 includes a resin with curability such as heat curability and ultraviolet curability. In this manner, the sealing material 60 can be formed in a desired shape by curing the resin after the raw material of the sealing material 60 is applied to the element substrate 10 and/or the opposed substrate 20. The sealing material 60 may include ionic impurities originating from a raw material such as resin and resin hardener. Such ionic impurities may be eluted to the liquid crystal layer. The liquid crystal apparatus 100 includes a second pixel electrode described later and the like and thus can suppress the diffusion of the ionic impurities to the liquid crystal layer.

The element substrate 10 includes a data line driving circuit 101, a plurality of external connection terminals 104, two scan line driving circuits 102, and an inspection circuit 103. The element substrate 10 is larger than the opposed substrate 20 in plan view. The plurality of external connection terminals 104 is provided in a region that does not overlap the opposed substrate 20 in the element substrate 10. The data line driving circuit 101 is provided between the plurality of external connection terminals 104 and the sealing material 60.

The liquid crystal apparatus 100 includes the display region E and a peripheral region S. The peripheral region S is disposed between the sealing material 60 and the display region E. The peripheral region S has a substantially rectangular shape, and surrounds the display region E in a frame shape. The peripheral region S overlaps a parting part 24 of the opposed substrate 20 in plan view, and as such does not contribute to the display of the liquid crystal apparatus 100.

At the element substrate 10 in the display region E, a first pixel electrode not illustrated in the drawing is disposed in association with the plurality of pixels P. At the element substrate 10 in the peripheral region S, a second pixel electrode not illustrated in the drawing is disposed. The first pixel electrode and the second pixel electrode are elaborated later.

In the element substrate 10, the two scan line driving circuits 102 and the inspection circuit 103 as peripheral circuits are provided. The two scan line driving circuits 102 and the inspection circuit 103 are disposed in a manner overlapping the peripheral region S in plan view. Note that the peripheral circuit of the present disclosure is not limited to the above description. A wiring 107 is also disposed in a manner overlapping the peripheral region S.

The two scan line driving circuits 102 are respectively disposed along the pair of short sides of the outer periphery of the display region E. The two scan line driving circuits 102 are electrically coupled through the wiring 107. The wiring 107 is provided along one side of the +Y direction of the pair of long sides of the outer periphery of the display region E. As with the wiring 107, the inspection circuit 103 is also provided along the above-described one side of the +Y direction. The inspection circuit 103 is electrically coupled to a data line described later.

The data line driving circuit 101 and the two scan line driving circuits 102 are electrically coupled to external connection terminal 104. A vertical conduction part 106 is provided at the four corners of the opposed substrate 20.

As illustrated in FIG. 2, the element substrate 10 and the opposed substrate 20 are disposed and separated to face each other in the direction along the Z axis with the sealing material 60 therebetween. A liquid crystal layer 50 is provided between the element substrate 10 and the opposed substrate 20, and is surrounded by the element substrate 10, the opposed substrate 20, and the sealing material 60. The liquid crystal layer 50 includes a liquid crystal 50a. The liquid crystal 50a has positive or negative dielectric anisotropy. This embodiment employs the liquid crystal 50a having negative dielectric anisotropy. Here, the liquid crystal 50a is each individual liquid crystal molecule making up the liquid crystal 50a, or a set of individual liquid crystal molecules.

The element substrate 10 includes a substrate 10s as a substrate body, a wiring layer including a TFT 30 as a driving transistor and the like, the first pixel electrode 15, the second pixel electrode 19, and an orientation film 18. In the element substrate 10, the substrate 10s, the wiring layer, the first pixel electrode 15 and the second pixel electrode 19 are disposed in this order in the direction toward the liquid crystal layer 50, and the orientation film 18 is further provided on the upper side thereof.

The first pixel electrode 15 and the second pixel electrode 19 are provided at the same layer in the layers stacked in the direction along the Z axis in the element substrate 10, and are composed of the same material. Examples of the material include a transparent conducting film of indium tin oxide (ITO), indium zinc oxide (IZO) and the like. The first pixel electrode 15 and the second pixel electrode 19 are formed by forming the above-described transparent conducting film, and then patterning it. In this manner, the second pixel electrode can be manufactured in the same process as the first pixel electrode, and the manufacturing process of the liquid crystal apparatus 100 can be simplified.

The opposed substrate 20 includes a substrate 20s as a substrate body, the parting part 24, an insulation layer 25, a common electrode 21, and an orientation film 22. In the opposed substrate 20, the substrate 20s, the parting part 24, the insulation layer 25, and the common electrode 21 are disposed in this order in the direction toward the liquid crystal layer 50, and the orientation film 22 is further provided in the −Z direction thereof.

The orientation film 18 is disposed between the first pixel electrode 15 and the second pixel electrode 19, with the upper surface facing the liquid crystal layer 50. The orientation film 18 includes a first vapor deposition film 18a and a second vapor deposition film 18b. The orientation film 22 is disposed between the common electrode 21 and the liquid crystal layer 50, with the lower surface facing the liquid crystal layer 50. The orientation film 22 includes a third vapor deposition film 22a and a fourth vapor deposition film 22b.

The orientation films 18 and 22 are formed based on the optical design of the liquid crystal apparatus 100. The orientation films 18 and 22 have a function of orienting the liquid crystal 50a of the liquid crystal layer 50. The orientational state of the liquid crystal 50a is changed by the voltage applied in accordance with the image signal described later.

The orientation films 18 and 22 substantially vertically orient the liquid crystal 50a having negative dielectric anisotropy. For the orientation films 18 and 22, an inorganic material such as silicon oxide is employed, for example. The orientation film 18 need not be composed of the two layers, the first vapor deposition film 18a and the second vapor deposition film 18b. The orientation film 22 need not be composed of the two layers, the third vapor deposition film 22a and the fourth vapor deposition film 22b. Each of the orientation films 18 and 22 may include three or more layers.

The orientation films 18 and 22 vertically orient the liquid crystal 50a by providing a pre-tilt. The inclination direction of the pre-tilt is along the direction that intersects the X axis and the Y axis. When the liquid crystal layer 50 is driven, the orientational state of the vertically oriented liquid crystal 50a with the orientation films 18 and 22 provided with a pre-tilt is changed in the above-described inclination direction. When the on/off driving of the liquid crystal layer 50 is repeated, the liquid crystal 50a repeats a behavior of inclining to the inclination direction of the pre-tilt and returning to the initial orientational state. Here, the orientational state where the liquid crystal 50a having negative dielectric anisotropy provided with a pre-tilt angle of less than 90 degrees is inverted with respect to the XY plane along which the surfaces of the orientation films 18 and 22 extend is referred to as substantially vertical orientation. The orientation films 18 and 22 are elaborated later.

For the substrates 10s and 20s, optically transparent and insulating flat plates such as glass substrates and quartz substrates are employed, for example. In the present specification, the optical transparency means that the transmittance of visible light is 50% or greater.

The liquid crystal apparatus 100 is of a transmission type, and light L enters it from the +Z direction, which is the opposed substrate 20 side, and the light L is emitted from the element substrate 10 through the liquid crystal layer 50. When transmitting through the liquid crystal layer 50, the light L is modulated in accordance with the orientational state of the liquid crystal 50a. The incident direction of the light L to the liquid crystal apparatus 100 is not limited to the above description, and the light L may enter it from the element substrate 10. In addition, the liquid crystal apparatus 100 is not limited to the transmission type, and may be of a reflection type. The liquid crystal apparatus 100 employs optical designs such as a normally white mode and a normally black mode. The liquid crystal apparatus 100 may include a polarizing element on the incident side and emission side of the light L.

Figure 3:
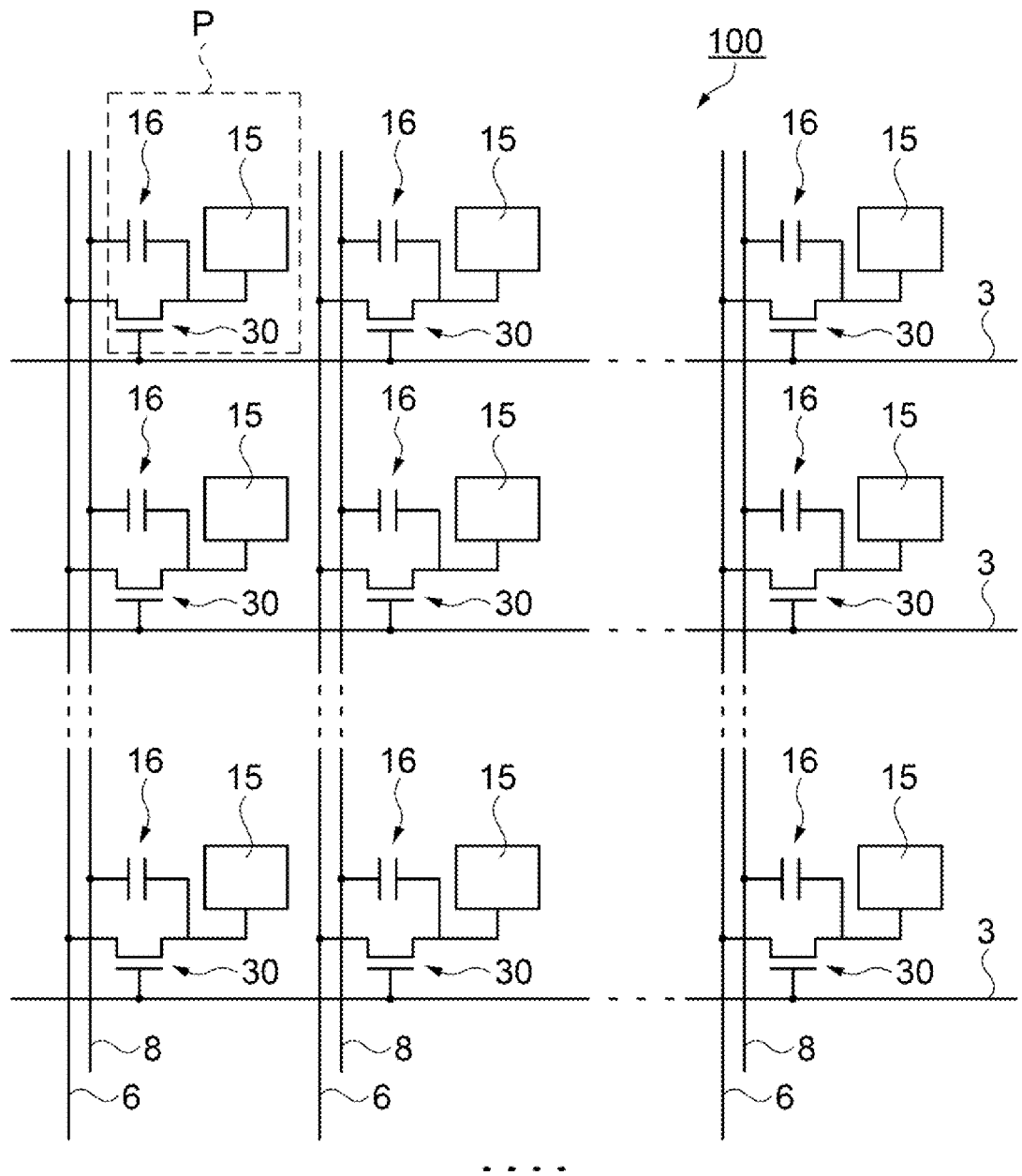
FIG. 3 is an equivalent circuit diagram illustrating an electrical configuration of the liquid crystal apparatus.

As illustrated in FIG. 3, the liquid crystal apparatus 100 includes a plurality of data lines 6, a plurality of data scan lines 3 and a plurality of data capacitance lines 8, as signal wirings insulated from each other. The scan line 3 extends along the X axis, and the data line 6 and the capacitance line 8 extend along the Y axis. Note that the capacitance line 8 is not limited to the configuration extending along the Y axis, and may be extended along the X axis.

The first pixel electrode 15, the TFT 30 and a capacitive element 16 are provided for each pixel P in the region sectioned by the scan line 3, and the data line 6 and the capacitance line 8, and make up the pixel circuit of the pixel P. The signal wirings such as the scan line 3, the data line 6 and the capacitance line 8 are provided in the above-described wiring layer.

The scan line 3 is electrically coupled to the gate of the TFT 30 as a switching element. The data line 6 is electrically coupled to the data line side source drain region of the TFT 30. The scan line 3 controls on and off of the TFT 30 provided on the same row at the same time. The first pixel electrode 15 is electrically coupled to the pixel electrode side source drain region of the TFT 30.

The data line 6 is electrically coupled to the above-described data line driving circuit 101, and supplies, to the pixel P, an image signal supplied from the data line driving circuit 101. The image signal may be line-sequentially supplied to each data line 6, or may be supplied to a plurality of adjacent data lines 6 for each group.

The scan line 3 is electrically coupled to the above-described scan line driving circuit 102, and supplies, to the pixel P, a scanning signal supplied from the scan line driving circuit 102. The scanning signal is line-sequentially supplied to the scan line 3 in a pulsed manner at a predetermined timing.

With an input of the scanning signal, the TFT 30 is set to an on state for a certain period, and an image signal is applied to the first pixel electrode 15 at a predetermined timing. The image signal is written to the liquid crystal layer 50 through the first pixel electrode 15 at a predetermined level, and is held for a certain period between the first pixel electrode 15 and the common electrode 21 with the liquid crystal layer 50 therebetween. At this time, the orientational state of the liquid crystal 50a is changed by a voltage applied in accordance with the image signal. For the purpose of preventing leakage of the held image signal, the capacitive element 16 is electrically coupled in parallel to a liquid crystal capacity provided between the first pixel electrode 15 and the common electrode 21. The capacitive element 16 is provided in the layer between the TFT 30 and the capacitance line 8.

Here, although not illustrated in the drawing, the above-described second pixel electrode 19, as with the first pixel electrode 15, makes up a pixel circuit in the peripheral region S together with the TFT 30, which is a driving transistor, the capacitive element 16, the scan line 3, the data line 6, and the capacitance line 8. While the pixel circuit has a circuit configuration similar to that of the pixel circuit including the first pixel electrode 15, it does not contribute to the display of the liquid crystal apparatus 100, but has a function of inducing the ionic impurities in the liquid crystal layer 50 to the peripheral region S.

Figure 4:
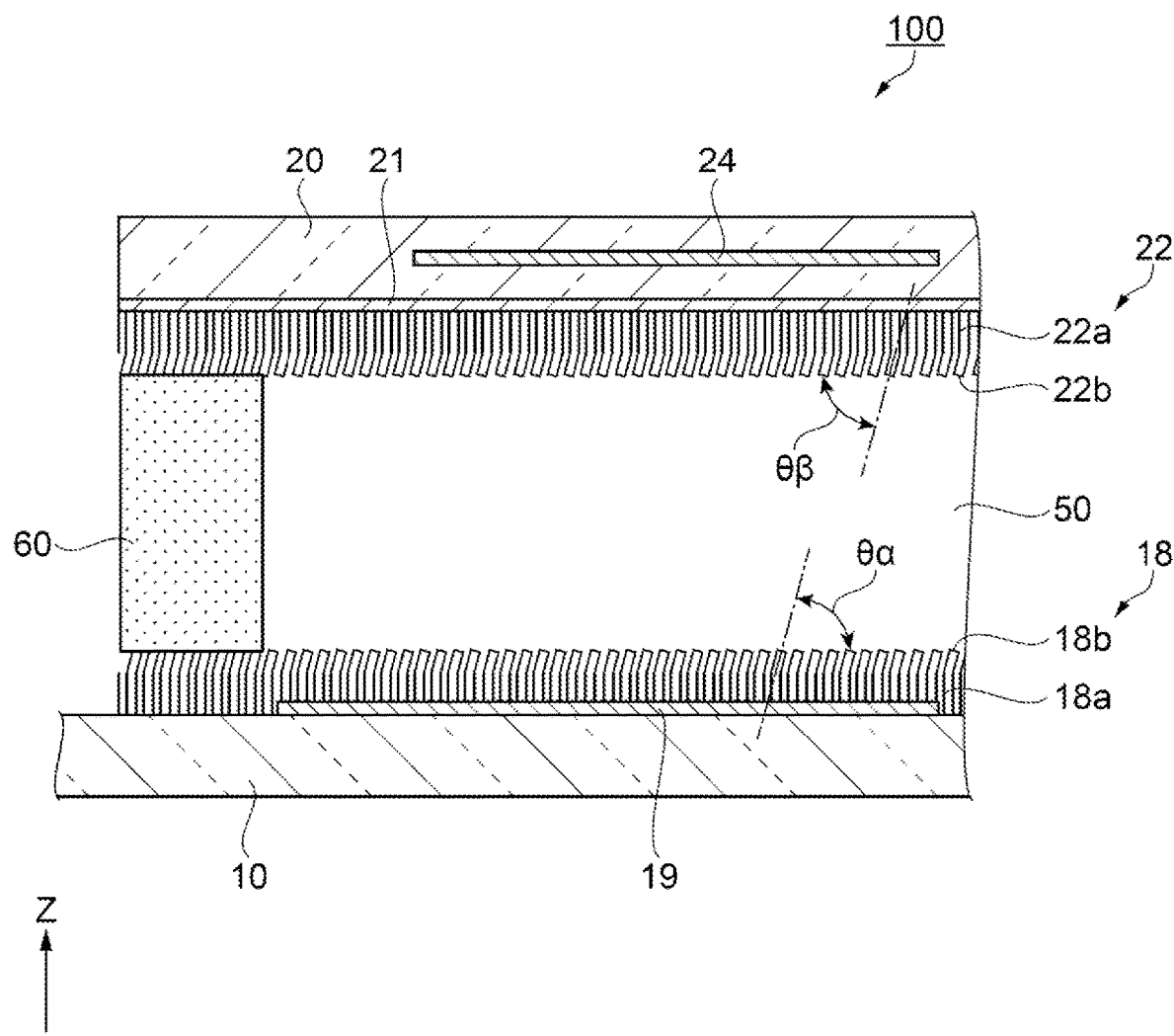
FIG. 4 is a schematic sectional view illustrating a configuration of an orientation film.

Configurations of the orientation films 18 and 22 and the like in the liquid crystal apparatus 100 are described below with reference to FIG. 4. FIG. 4 illustrates a cross section of a region including the sealing material 60 and the liquid crystal layer 50 in the vicinity of the data line driving circuit 101 in the liquid crystal apparatus 100 illustrated in FIG. 1. The cross section is along a surface orthogonal to the XY plane, including the oblique vapor deposition direction of the second vapor deposition film 18b and the fourth vapor deposition film 22b in plan view. The oblique vapor deposition direction is, for example, a direction including the upper right corner and the lower left corner of the display region E in plan view. Note that in FIG. 4, the illustration of some configurations in the element substrate 10 and the opposed substrate 20 is omitted. In addition, the second pixel electrode 19 is illustrated in an integral form in FIG. 4 for the sake of convenience of illustration, but in practice, the second pixel electrode 19 is divided at a plurality of portions in the above-described cross section.

As illustrated in FIG. 4, the orientation film 18 of the element substrate 10 includes the first vapor deposition film 18a, and the second vapor deposition film 18b disposed between the first vapor deposition film 18a and the liquid crystal layer 50. The first vapor deposition film 18a is disposed to cover the first pixel electrode 15 not illustrated in the drawing and the second pixel electrode 19 provided at the same layer as the first pixel electrode 15, on the upper side of them.

The orientation film 22 of the opposed substrate 20 includes the third vapor deposition film 22a, and the fourth vapor deposition film 22b disposed between the third vapor deposition film 22a and the liquid crystal layer 50. The third vapor deposition film 22a is disposed in the −Z direction of the common electrode 21 to cover the common electrode 21.

The first vapor deposition film 18a is formed by vacuum deposition from the +Z direction with respect to the main surface of with respect to the element substrate 10. The first vapor deposition film 18a includes a plurality of columns whose longitudinal direction is along the Z axis. The third vapor deposition film 22a is formed by vacuum deposition from the −Z direction with respect to the main surface of the opposed substrate 20. The third vapor deposition film 22a includes a plurality of columns whose longitudinal direction is along the Z axis. As the material for forming the first vapor deposition film 18a and the third vapor deposition film 22a, silicon oxide, aluminum oxide, oxidation magnesium and the like are employed.

The second vapor deposition film 18b is disposed to cover the upper side of the first vapor deposition film 18a. The thickness of the second vapor deposition film 18b, i.e., the length in the direction along the Z axis, is smaller than the thickness of the first vapor deposition film 18a. The second vapor deposition film 18b includes a plurality of columns whose longitudinal direction intersects the main surface of the element substrate 10 at angle θα. The longitudinal direction of the column of the second vapor deposition film 18b intersects the direction along the Z axis, which is the thickness direction of the liquid crystal layer 50, at an angle of (90-θα) degrees.

The column of the second vapor deposition film 18b is a columnar crystalline form of silicon oxide. The column is formed by a vacuum deposition method. More specifically, through oblique deposition of silicon oxide from a direction at an acute angle to the direction of angle θα, the column of the second vapor deposition film 18b is formed.

The fourth vapor deposition film 22b is disposed to cover the −Z direction of the third vapor deposition film 22a. The thickness of the fourth vapor deposition film 22b, i.e., the length in the direction along the Z axis, is smaller than the thickness of the third vapor deposition film 22a. The fourth vapor deposition film 22b includes a plurality of columns whose longitudinal direction intersects the main surface of the opposed substrate 20 at angle θβ. The longitudinal direction of the column of the fourth vapor deposition film 22b intersects the direction along the Z axis, which is the thickness direction of the liquid crystal layer 50, at an angle of (90-θβ) degrees.

The column of the fourth vapor deposition film 22b is a columnar crystalline form of silicon oxide. The column is formed by a vacuum deposition method. More specifically, through oblique deposition of silicon oxide from a direction at an acute angle to the direction of angle θβ, the column of the fourth vapor deposition film 22b is formed. Note that angle θβ may be an angle equal to angle θα.

With the configuration of the orientation films 18 and 22, the plurality of columns of the second vapor deposition film 18b and the fourth vapor deposition film 22b can orient the liquid crystal 50a. In addition, the orientation films 18 and 22 can be formed through dry processing.

The inclination direction of the pre-tilt of the liquid crystal 50a is set such that the orientation angle to the Y axis is 45 degrees, for example. The inclination direction of the pre-tilt is set by the vapor deposition direction of the oblique vapor deposition for forming the second vapor deposition film 18b and the fourth vapor deposition film 22b.

In the liquid crystal apparatus 100, the polarizing elements not illustrated in the drawing are disposed on the incident side and the emission side of the light L describe above. The two polarizing elements are disposed in the liquid crystal apparatus 100 such that the transmission axis or absorption axis of one polarizing element is parallel to the X axis or the Y axis, and that the transmission axes or absorption axes of the two polarizing elements are orthogonal to each other.

The vapor deposition direction of the oblique vapor deposition for forming the second vapor deposition film 18b and the fourth vapor deposition film 22b is aligned with the inclination direction of the pre-tilt of the desired liquid crystal 50a in plan view. In this embodiment, the second vapor deposition film 18b and the fourth vapor deposition film 22b are disposed such that the orientation angle of the pre-tilt of the liquid crystal 50a intersects the transmission axis or absorption axis of the two polarizing elements at 45 degrees. In this manner, when the liquid crystal layer 50 is driven by applying a drive voltage between the first pixel electrode 15 and the common electrode 21, the liquid crystal 50a is inclined to the inclination direction of the pre-tilt, and high transmittance is obtained.

A surface treatment using a silane coupling agent is provided at the surfaces of the element substrate 10 and the opposed substrate 20. More specifically, an organopolysiloxane film is provided using a silane coupling agent at the surfaces of the second vapor deposition film 18b of the element substrate 10 and the fourth vapor deposition film 22b of the opposed substrate 20.

With the silane coupling agent, the silanol groups bond to the silicon oxide of the second vapor deposition film 18b and the fourth vapor deposition film 22b, and dehydration condensation occurs. In this manner, an organopolysiloxane film with oriented hydrophobic groups is formed at the interface with the liquid crystal layer 50 on the surface side. Through this surface treatment, the surfaces of the second vapor deposition film 18b and the fourth vapor deposition film 22b have a large contact angle with respect to water. Thus, the photochemical reaction between the liquid crystal 50a and the orientation films 18 and 22 is suppressed, and the light resisting property of the liquid crystal apparatus 100 can be improved. As the surface treatment method using a silane coupling agent, publicly known methods may be employed.

Through the above-described surface treatment, the contact angle to the water at the surface facing the liquid crystal layer 50 is set to 50 degrees or greater, at the orientation films 18 and 22. In this manner, the photochemical reaction between the liquid crystal 50a and the orientation films 18 and 22 is further suppressed, and the light resisting property of the liquid crystal apparatus 100 can be improved. Preferably, the above-described contact angle is from 60 degrees to 90 degrees. When the above-described contact angle is equal to or greater than 60, the water-repellency of the orientation films 18 and 22 is increased and the light resisting property can be further improved. When the above-described contact angle is equal to or smaller than 90 degrees, the uneven distribution of the ionic impurities is suppressed, and the display quality of the liquid crystal apparatus 100 can be improved. The contact angle of the orientation films 18 and 22 with respect to water is measured by JIS R3257; 1999.

The opposed substrate 20 includes the parting part 24 formed of a light-shielding metal film or the like. The parting part 24 is disposed on the +Z direction side relative to the common electrode 21. In plan view, the parting part 24 overlaps the second pixel electrode 19. Therefore, even when the second pixel electrode 19 is driven and the ionic impurities of the liquid crystal layer 50 are induced by the second pixel electrode 19, the display quality of the liquid crystal apparatus 100 is ensured.

Figure 5:
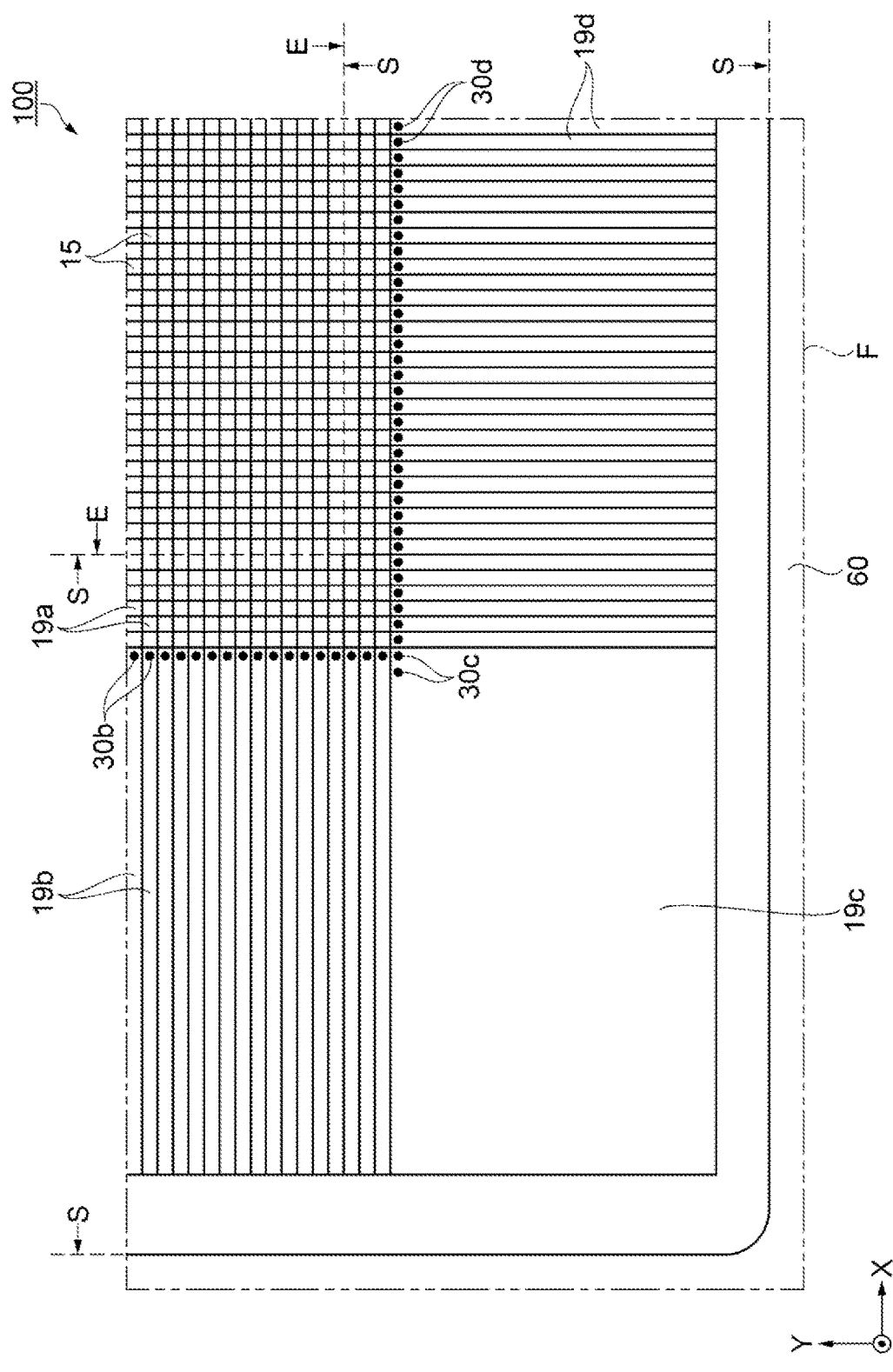

The arrangement of the first pixel electrode 15, the second pixel electrode 19 and the like is described below with reference to FIG. 5. FIG. 5 illustrates the region F of FIG. 1 in an enlarged manner. In addition, in FIG. 5, the illustration of some configurations such as the scan line driving circuit 102 is omitted for the sake of clarity of the drawing. Further, in FIG. 5, the shape and size of TFTs 30b, 30c and 30d described later are different from the actual shape and size for the sake of convenience of illustration. Note that unless otherwise noted, the following description related to FIG. 5 means the state in plan view.

As illustrated in FIG. 5, in the liquid crystal apparatus 100, the peripheral region S is disposed to surround the display region E. The peripheral region S is a region between the outer periphery edge of the display region E and the inner periphery edge of the sealing material 60. In the peripheral region S, second pixel electrodes 19a, 19b, 19c and 19d are disposed as the second pixel electrode 19. Each of the second pixel electrodes 19a, 19b, 19c and 19d is AC-driven by the TFT 30 and the TFTs 30b, 30c and 30d described later.

A plurality of the second pixel electrodes 19a are disposed in a frame shape surrounding the display region E. The second pixel electrode 19a is substantially square in plan view, and has a shape similar to that of the first pixel electrode 15. The TFT 30 (not illustrated in the drawing), which is a driving transistor, is disposed in association with each of the plurality of second pixel electrodes 19a. In plan view, the TFT 30 of the second pixel electrode 19a is provided at a position that does not overlap the peripheral circuits such as the scan line driving circuit 102 and the inspection circuit 103 and the wirings such as the wiring 107.

A plurality of the second pixel electrodes 19b are disposed in the −X direction of the display region E and in the +X direction of the display region E not illustrated in the drawing, through the second pixel electrode 19a. Specifically, the second pixel electrode 19b is disposed in the −X direction of each of the second pixel electrodes 19a arranged along the Y axis on the most −X direction side among the plurality of second pixel electrodes 19a. In addition, the second pixel electrode 19b is also disposed in the +X direction of each of the second pixel electrodes 19a disposed along the Y axis on the most +X direction side among the plurality of second pixel electrodes 19a.

The second pixel electrode 19b has a rectangular shape that is slender in the direction along the X axis. In the second pixel electrode 19b, the length in the direction along the Y axis is equal to the length of the second pixel electrode 19a in the direction along the Y axis, and the length in the direction along the X axis is greater than the length of the second pixel electrode 19a in the direction along the X axis.

The TFT 30b, which is a driving transistor, is disposed in association with each of the plurality of second pixel electrodes 19b. The TFT 30b of the second pixel electrode 19b is provided at a position that does not overlap the peripheral circuits such as the scan line driving circuit 102 in plan view. More specifically, at the second pixel electrode 19b located in the −X direction of the display region E, the TFT 30b is provided in the vicinity of the end portion in the +X direction. In addition, although not illustrated in the drawing, at the second pixel electrode 19b located in the +X direction of the display region E, the TFT 30b is provided in the vicinity of the end portion in the −X direction.

Here, the arrangement of the TFT 30b is not limited to the above-described arrangement as long as it does not overlap the peripheral circuits such as the scan line driving circuit 102 in plan view. For example, the TFT 30b may be provided in the vicinity of the end portion in the −X direction for the second pixel electrode 19b located in the −X direction of the display region E, and may be provided in the vicinity of the end portion in the +X direction for the second pixel electrode 19b located in the +X direction of the display region E. Each second pixel electrode 19b is driven by a plurality of the TFTs 30b provided at positions that do not overlap the above-described peripheral circuit.

The second pixel electrodes 19c are disposed at the four corners of the peripheral region S. Specifically, one second pixel electrode 19c is disposed at each of the four corners, and thus four second pixel electrodes 19c are provided in total. The second pixel electrode 19c has a rectangular shape, with the length in the direction along the X axis equal to the length of the second pixel electrode 19b in the direction along the X axis, and the length in the direction along the Y axis equal to the length of the second pixel electrode 19d described later in the direction along the Y axis.

The TFTs 30c, which are the driving transistors, are disposed for respective second pixel electrodes 19c at the four corners of the peripheral region S. The TFT 30c of the second pixel electrode 19c is provided at a position that does not overlap the peripheral circuits such as the scan line driving circuit 102 in plan view. More specifically, in the second pixel electrode 19c illustrated in FIG. 5, the TFTs 30c are disposed at corners in the +X direction and the +Y direction, in the vicinity of the four corners of the display region E. The TFTs 30c corresponding to the other three second pixel electrodes 19c not illustrated in the drawing are disposed in the vicinity of the four corners of the display region E as in the above-described manner.

The four second pixel electrodes 19c may be respectively electrically coupled to a plurality of the TFTs 30c provided at positions that do not overlap the above-described peripheral circuit. The second pixel electrode 19c has a larger area than that of the second pixel electrodes 19a, 19b and 19d in plan view. As such, the electrical coupling with a plurality of driving transistor TFTs 30c can reduce the driving load.

Preferably, the plurality of the TFTs 30c electrically coupled to the second pixel electrodes 19c are adjacent to each other in the direction along the X axis. Although not illustrated in the drawing, the direction along the X axis is the extending direction of the scan line 3 electrically coupled to the source region of the TFT 30c in the liquid crystal apparatus 100. In this manner, the plurality of driving transistor TFTs 30c are adjacent to each other in the extending direction of the scan line 3, and thus the drive control of the second pixel electrodes 19c at the four corners can be easily performed. Note that the number of the TFTs 30c electrically coupled to the second pixel electrode 19c is not limited to two, and may be three or more.

A plurality of the second pixel electrodes 19d are disposed in the −Y direction of the display region E and in the +Y direction of the display region E not illustrated in the drawing, through the second pixel electrode 19a. Specifically, the second pixel electrode 19d is disposed in the −Y direction of each of the second pixel electrodes 19a arranged along the X axis on the most −Y direction among the plurality of second pixel electrodes 19a. In addition, the second pixel electrode 19b is disposed in the +Y direction of each of the second pixel electrodes 19a arranged along the X axis on the most +Y direction among the plurality of second pixel electrodes 19a.

The second pixel electrode 19d has a rectangular shape that is slender in the direction along the Y axis. In the second pixel electrode 19d, the length in the direction along the X axis is equal to the length of the second pixel electrode 19a in the direction along the X axis, and the length in the direction along the Y axis is greater than the length of the second pixel electrode 19a in the direction along the Y axis.

The TFT 30d, which is a driving transistor, is disposed in association with the plurality of the second pixel electrodes 19d. The TFT 30d of the second pixel electrode 19d is provided at a position that does not overlap the peripheral circuits such as the scan line driving circuit 102 and the inspection circuit 103 and the wirings such as the wiring 107 in plan view. More specifically, at the second pixel electrode 19d located in the −Y direction of the display region E, the TFT 30d is provided in the vicinity of the end portion in the +Y direction. In addition, although not illustrated in the drawing, at the second pixel electrode 19d located in the +Y direction of the display region E, the TFT 30d is provided in the vicinity of the end portion in the −Y direction. Note that each second pixel electrode 19d is driven by the plurality of the TFTs 30d provided at positions that do not overlap the above-described peripheral circuit and wirings.

Note that the arrangement of the TFT 30d is not limited to the above-described arrangement as long as it does not overlap the peripheral circuits such as the scan line driving circuit 102 in plan view. For example, the TFT 30d may be provided in the vicinity of the end portion in the −Y direction for the second pixel electrode 19d located in the −Y direction of the display region E, and may be provided in the vicinity of the end portion in the +Y direction for the second pixel electrode 19d located in the +Y direction of the display region E.

The arrangement of the TFTs 30b, 30c and 30d is not limited the above-described arrangement, and they may be disposed at any position as long as they do not overlap the peripheral circuits and the wirings in plan view. In this manner, the second pixel electrodes 19b, 19c and 19d extend from the region that does not overlap the peripheral circuits such as the scan line driving circuit 102 to the region that overlaps the peripheral circuit in plan view. Here, the second pixel electrodes 19b, 19c and 19d may extend from the region that does not overlap the peripheral circuit and the wirings to the region that overlaps them, and then to the region that does not overlap them in plan view.

Note that in the liquid crystal apparatus 100, the second pixel electrode 19a may be omitted. Specifically, the second pixel electrodes 19b, 19c and 19d may be disposed adjacent to the outer periphery edge of the display region E.

According to this embodiment, the following effects can be achieved.

The occurrence of defects originating from ionic impurities can be suppressed. Specifically, the TFTs 30, 30b, 30c and 30d, which are the driving transistors of the second pixel electrode 19, are provided at positions that do not overlap the peripheral circuit in plan view. The second pixel electrodes 19b, 19c and 19d are provided to extend from the region that does not overlap the peripheral circuit to the region that overlaps it in plan view. Therefore, even when the peripheral circuits such as the scan line driving circuit 102 and the inspection circuit 103 and the second pixel electrodes 19b, 19c and 19d are disposed in an overlapping manner in plan view, the second pixel electrode 19 can be driven. Here, in general, ionic impurities tend to be guided to corners of the display region E when the pixel electrode is driven. Therefore, with the second pixel electrode 19 to be AC-driven disposed in the peripheral region S, the ionic impurities are guided to the outside of the display region E. In this manner, the occurrence of defects originating from the ionic impurities is suppressed. Thus, the liquid crystal apparatus 100 that suppresses the occurrence of defects originating from ionic impurities can be provided.

2. Second Embodiment

In this embodiment, an active drive type liquid crystal apparatus including a TFT is exemplified as an electrooptic apparatus. A liquid crystal apparatus 200 according to this embodiment is different from the liquid crystal apparatus 100 of the first embodiment in that a peripheral electrode is provided in the peripheral region S. In the following description, the same configurations as those of the first embodiment are denoted with the same reference numerals, and reiterated descriptions will be omitted.

Figure 6:
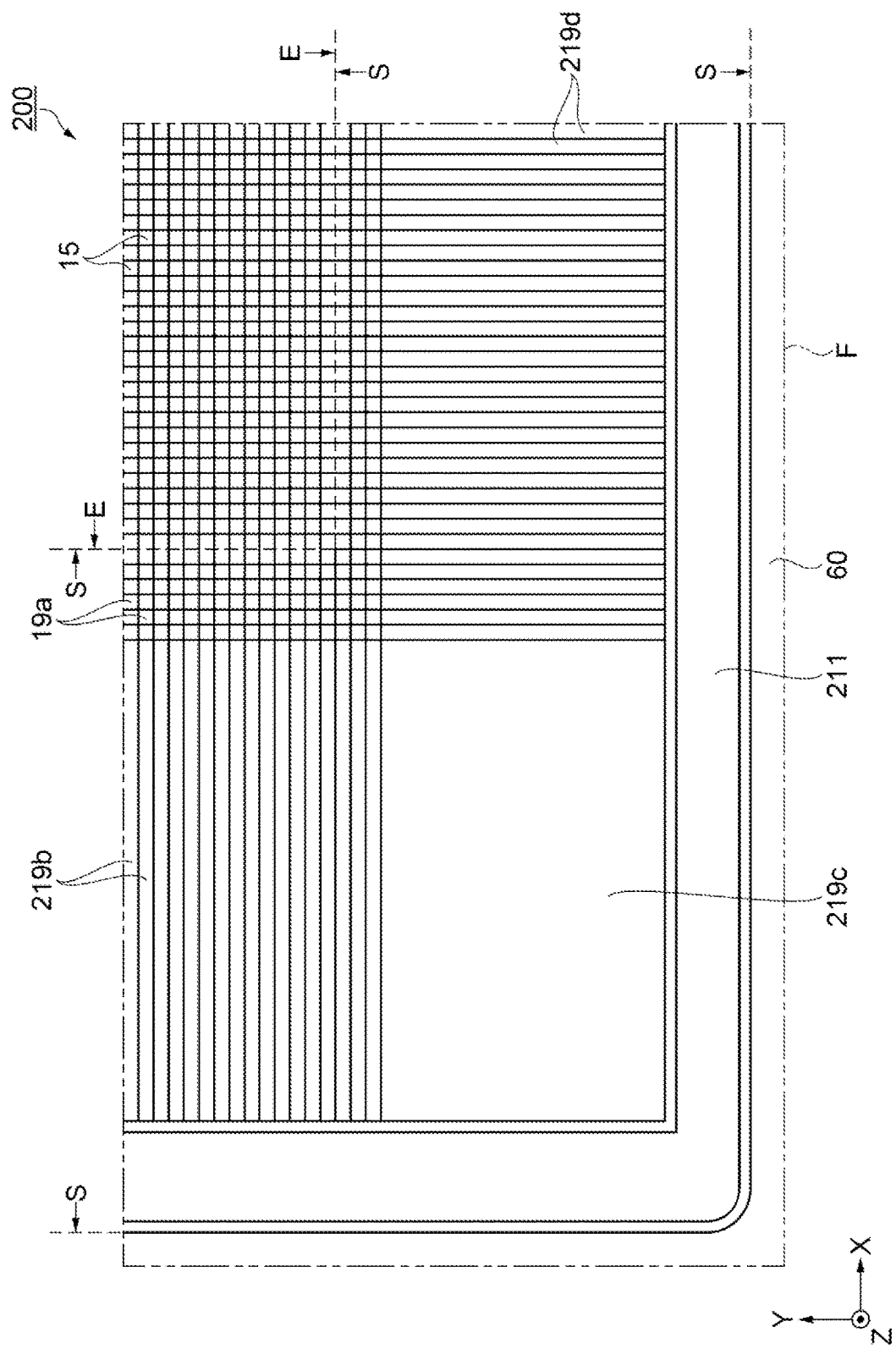
FIG. 6 is a schematic plan view illustrating an arrangement of a peripheral electrode, a first pixel electrode and a second pixel electrode according to a second embodiment.

A configuration of the liquid crystal apparatus 200 of this embodiment is described below with reference to FIG. 6. FIG. 6 illustrates a region corresponding to FIG. 5 of the first embodiment in the liquid crystal apparatus 200 in an enlarged manner. In addition, in FIG. 6, the illustration of some configurations such as the scan line driving circuit 102 is omitted for the sake of clarity of the drawing. Note that unless otherwise noted, the following description related to FIG. 6 means the state in plan view.

As illustrated in FIG. 6, in the liquid crystal apparatus 200, the peripheral region S is disposed to surround the display region E. In the peripheral region S, a peripheral electrode 211 and second pixel electrodes 19a, 219b, 219c and 219d are disposed. The second pixel electrodes 219b, 219c and 219d surround the second pixel electrode 19a. A plurality of the second pixel electrodes 219b are disposed both in the −X direction and the +X direction not illustrated in the drawing of the second pixel electrode 19a, and a plurality of the second pixel electrodes 219d are disposed both in the −Y direction and the +Y direction not illustrated in the drawing of the second pixel electrode 19a. One second pixel electrode 219c is disposed at each of the four corners of the peripheral region S.

The second pixel electrode 219b has a rectangular shape that is slender in the direction along the X axis. In the second pixel electrode 219b, the length in the direction along the Y axis is equal to the length of the second pixel electrode 19a in the direction along the Y axis, and the length in the direction along the X axis is greater than the length of the second pixel electrode 19a in the direction along the X axis.

The second pixel electrode 219d has a rectangular shape that is slender in the direction along the Y axis. In the second pixel electrode 219d, the length in the direction along the X axis is equal to the length of the second pixel electrode 19a in the direction along the X axis, and the length in the direction along the Y axis is greater than the length of the second pixel electrode 19a in the direction along the Y axis.

The second pixel electrode 219c has a rectangular shape, with the length in the direction along the X axis equal to the length of the second pixel electrode 219b in the direction along the X axis, and the length in the direction along the Y axis equal to the length of the second pixel electrode 219d in the direction along the Y axis.

The peripheral electrode 211 surrounds the second pixel electrodes 219b, 219c and 219d in a frame shape. Specifically, in the peripheral region S, the second pixel electrodes 19a, 219b, 219c and 219d are disposed on the display region E side, and the peripheral electrode 211 is disposed on the sealing material 60 side.

The first pixel electrode 15, the second pixel electrodes 19a, 219b, 219c and 219d, and the peripheral electrode 211 are provided at the same layer in the layers stacked in the direction along the Z axis of the element substrate 10, and are composed of the same material. The second pixel electrodes 19a, 219b, 219c and 219d, and the peripheral electrode 211 can be manufactured in the same process as the first pixel electrode 15, and the manufacturing process of the liquid crystal apparatus 200 can be simplified.

The second pixel electrodes 219b, 219c and 219d is AC-driven by the TFT as a driving transistor not illustrated in the drawing. The TFTs of the second pixel electrodes 219b, 219c and 219d are provided at positions similar to those of the TFTs 30b, 30c and 30d, respectively, of the first embodiment. The TFT does not overlap the peripheral circuits such as the scan line driving circuit 102 and the inspection circuit 103 and the wirings such as the wiring 107 in plan view. Specifically, the second pixel electrodes 219b, 219c and 219d extend from the region that does not overlap the peripheral circuit to the region that overlaps the peripheral circuit in plan view. Note that the second pixel electrodes 219b, 219c and 219d may be electrically coupled to a plurality of TFTs.

The peripheral electrode 211 is provided between the region where the second pixel electrodes 219b, 219c and 219d are disposed, and the sealing material 60. The outer periphery of the peripheral electrode 211 is along the inner periphery of the sealing material 60. Although not illustrated in the drawing, the peripheral electrode 211 is electrically coupled to any of the external connection terminals 104 other than that electrically coupled to the vertical conduction part 106. In this manner, a DC potential of positive or negative polarity is applied to the peripheral electrode 211, relative to the common electrode potential applied to the common electrode 21.

The above-described DC potential is a fixed potential whose polarity is set in accordance with the ionic impurities to be induced. More specifically, a positive DC potential is applied in the case where the ionic impurities are minus ions, and a negative DC potential is applied in the case where the ionic impurities are plus ions. The DC potential may be applied to the peripheral electrode 211 at all times while the liquid crystal apparatus 200 is in operation, or may be intermittently applied.

When the DC potential is applied to the peripheral electrode 211 while the liquid crystal apparatus 200 is in operation, a transverse electric field is generated between the second pixel electrodes 219b, 219c and 219d and the peripheral electrode 211. The ionic impurities are induced from the display region E to the peripheral region S side when the second pixel electrodes 19a, 219b, 219c and 219d are driven. Further, the ionic impurities are induced to the peripheral electrode 211 by the transverse electric field, and moves away from the display region E.

In plan view, the width of the peripheral electrode 211 is smaller than the width of the region where the second pixel electrodes 19a, 219b, 219c and 219d are disposed. Here, the width is the crossing distance along the X axis and the the crossing distance along the Y axis with respect to an object. That is, the width of the peripheral electrode 211 is small in the whole circumference, relative to the width of the region where the second pixel electrodes 19a, 219b, 219c and 219d are disposed. In this manner, the ionic impurities induced to the peripheral electrode 211 are less protruded into the display region E.

According to this embodiment, the ionic impurities are induced to the peripheral electrode 211, and thus the occurrence of defects originating from ionic impurities can be further suppressed while achieving the effects of the first embodiment.

3. Third Embodiment

In this embodiment, an active drive type liquid crystal apparatus including a TFT is exemplified as an electrooptic apparatus. A liquid crystal apparatus 300 according to this embodiment is different from the liquid crystal apparatus 200 of the second embodiment in that the configurations of the second pixel electrodes 219b and 219d and the peripheral electrode 211 are changed. In the following description, the same configurations as those of the first embodiment and the second embodiment are denoted with the same reference numerals, and reiterated descriptions will be omitted.

Figure 7:
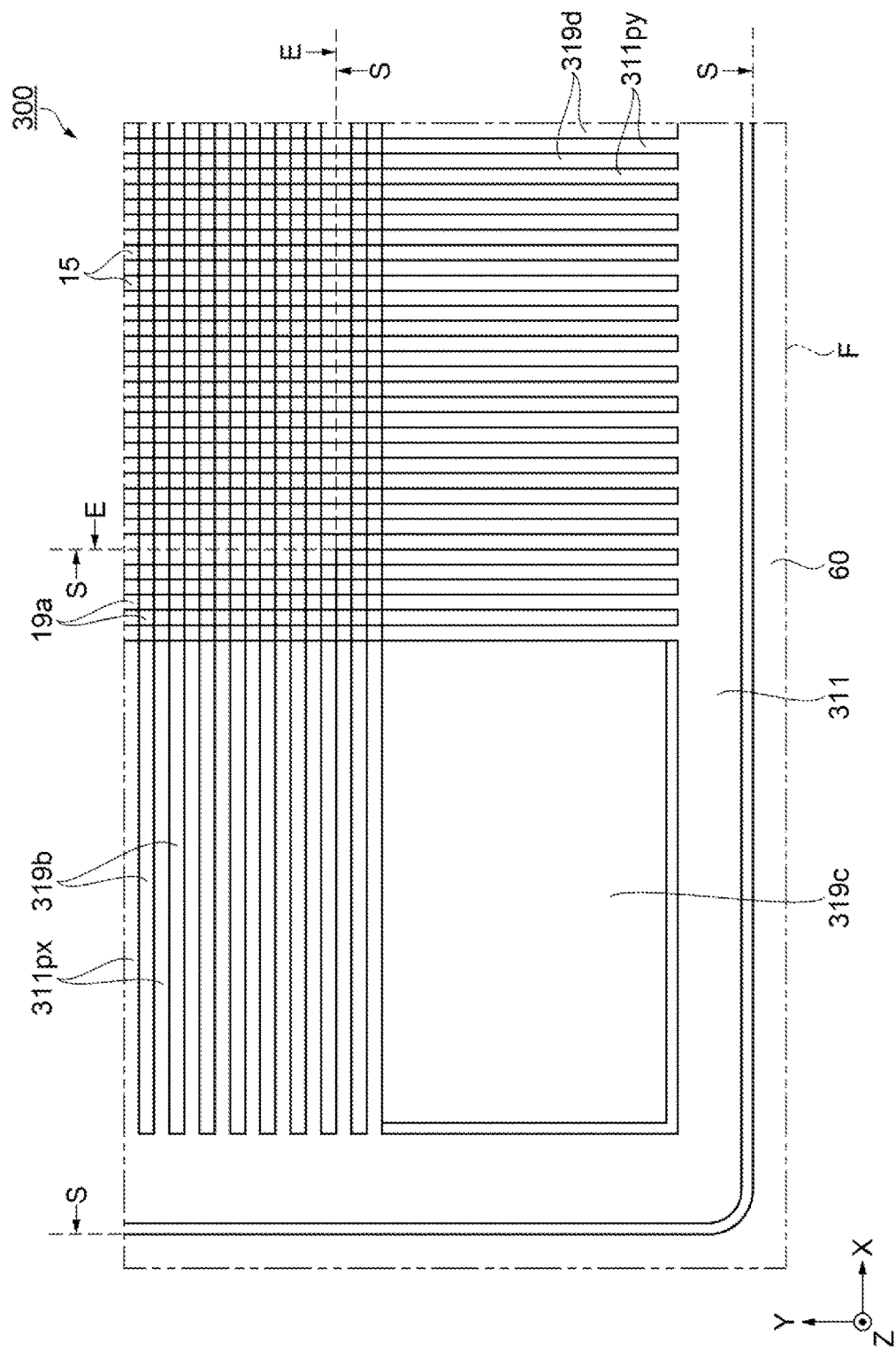
FIG. 7 is a schematic plan view illustrating a configuration of a peripheral electrode and a second pixel electrode according to a third embodiment.

A configuration of the liquid crystal apparatus 300 of this embodiment is described below with reference to FIG. 7. FIG. 7 illustrates a region corresponding to FIG. 5 of the first embodiment in the liquid crystal apparatus 300 in an enlarged manner. In addition, in FIG. 7, the illustration of some configurations such as the scan line driving circuit 102 is omitted for the sake of clarity of the drawing. Note that unless otherwise noted, the following description related to FIG. 7 means the state in plan view.

As illustrated in FIG. 7, a peripheral electrode 311 and second pixel electrodes 19a, 319b, 319c and 319d are disposed in the peripheral region S. The second pixel electrodes 319b, 319c and 319d are disposed on the outer periphery side of the second pixel electrode 19a. For the second pixel electrode 19a, a plurality of the second pixel electrodes 319b are disposed in the −X direction and in the +X direction not illustrated in the drawing, and a plurality of the second pixel electrodes 319d are disposed in the −Y direction and in the +Y direction not illustrated in the drawing. One second pixel electrode 319c is disposed at each of the four corners of the peripheral region S.

The second pixel electrode 319b has a rectangular shape that is slender in the direction along the X axis. In the second pixel electrode 319b, the length in the direction along the Y axis is equal to the length of the second pixel electrode 19a in the direction along the Y axis, and the length in the direction along the X axis is greater than the length of the second pixel electrode 19a in the direction along the X axis.

The second pixel electrode 319d has a rectangular shape that is slender in the direction along the Y axis. In the second pixel electrode 319d, the length in the direction along the X axis is equal to the length of the second pixel electrode 19a in the direction along the X axis, and the length in the direction along the Y axis is greater than the length of the second pixel electrode 19a in the direction along the Y axis.

The second pixel electrode 319c has a rectangular shape, with the length in the direction along the X axis equal to the length of the second pixel electrode 319b in the direction along the X axis, and the length in the direction along the Y axis equal to the length of the second pixel electrode 319d in the direction along the Y axis.

The peripheral electrode 311 is disposed in a region between the sealing material 60 and the second pixel electrode 19a, and surrounds the second pixel electrode 19a in a frame shape. The peripheral electrode 311 includes a plurality of protruding parts 311px protruding to the region where the second pixel electrode 319b is disposed, and a plurality of protruding parts 311py protruding to the region where the second pixel electrode 319d is disposed.

The plurality of protruding parts 311px is provided in a comb-tooth shape protruding to the +X direction from the inner periphery edge of the peripheral electrode 311. Although not illustrated in the drawing, in the +X direction of the display region E, the plurality of protruding parts 311px are provided in a comb-tooth shape protruding to the −X direction from the inner periphery edge of the peripheral electrode 311. Each protruding part 311px has a rectangular shape that is slender in the direction along the X axis, with one end portion formed continuously from the body of the peripheral electrode 311. In the protruding part 311px, the length in the direction along the X axis is equal to the length of the second pixel electrode 319b in the direction along the X axis, and the length in the direction along the Y axis is equal to the length of the second pixel electrode 19a in the direction along the Y axis. The plurality of protruding parts 311px and the plurality of second pixel electrodes 319b are disposed in a staggered manner in the direction along the Y axis.

The plurality of protruding parts 311py are provided in a comb-tooth shape protruding to the +Y direction from the inner periphery edge of the peripheral electrode 311. Although not illustrated in the drawing, the plurality of protruding parts 311py are provided in a comb-tooth shape protruding to the −Y direction from the inner periphery edge of the peripheral electrode 311 in the +Y direction of the display region E. Each protruding part 311py has a rectangular shape that is slender in the direction along the Y axis, with one end portion formed continuously from the body of the peripheral electrode 311. In the protruding part 311py, the length in the direction along the Y axis is equal to the length of the second pixel electrode 319d in the direction along the Y axis, and the length in the direction along the X axis is equal to the length of the second pixel electrode 19a in the direction along the X axis. The plurality of protruding parts 311py and the plurality of second pixel electrodes 319d are disposed in a staggered manner in the direction along the X axis.

Here, the number and the shape in plan view of the protruding parts 311px and 311py are not limited to the above-described number and shape. In addition, in the region where the second pixel electrode 319c is disposed, a peripheral electrode may be disposed instead of the second pixel electrode 319c. A DC potential of positive or negative polarity is applied to the peripheral electrode.

The first pixel electrode 15, the second pixel electrodes 19a, 319b, 319c and 319d, and the peripheral electrode 311 including the protruding parts 311px and 311py are provided at the same layer in the layers stacked in the direction along the Z axis of the element substrate 10, and are composed of the same material. The second pixel electrodes 19a, 319b, 319c and 319d and the peripheral electrode 311 can be manufactured in the same process as the first pixel electrode 15, and thus the manufacturing process of the liquid crystal apparatus 300 can be simplified.

The second pixel electrodes 319b, 319c and 319d are AC-driven by the TFT as a driving transistor not illustrated in the drawing. The TFTs of the second pixel electrodes 319b, 319c and 319d are provided at positions similar to those of the TFTs 30b, 30c and 30d, respectively, of the first embodiment. The TFT does not overlap the peripheral circuits such as the scan line driving circuit 102 and the inspection circuit 103 and the wirings such as the wiring 107 in plan view. Specifically, the second pixel electrodes 319b, 319c and 319d extend from the region that does not overlap the peripheral circuit to the region that overlaps the peripheral circuit in plan view. Note that the second pixel electrodes 319b, 319c and 319d may be electrically coupled to a plurality of TFTs.

The peripheral electrode 311 is provided between the region where the second pixel electrode 19a is disposed and the sealing material 60. The outer periphery of the peripheral electrode 311 is along the inner periphery of the sealing material 60. Although not illustrated in the drawing, the peripheral electrode 311 is electrically coupled to any of the external connection terminals 104 other than that electrically coupled to the vertical conduction part 106. In this manner, a DC potential of positive or negative polarity is applied to the peripheral electrode 311, relative to the common electrode potential applied to the common electrode 21. In this manner, the peripheral electrode 311 has a function of inducing ionic impurities as with the peripheral electrode 211 of the second embodiment.

According to this embodiment, the following effects can be achieved while achieving the effects of the second embodiment. The occurrence of burn-in of ionic impurities can be suppressed in the vicinity of the boundary between the peripheral electrode 311 and the second pixel electrodes 19a, 319b, 319c and 319d. Specifically, at the peripheral electrode 311, the plurality of protruding parts 311px and 311py are protruded into the regions of the second pixel electrodes 319b and 319d. As such, in comparison with the case where the boundary line between the second pixel electrodes 319b and 319d and the peripheral electrode 311 is linear in plan view, the total length of the above-described boundary line is increased. Thus, the uneven distribution of the ionic impurities induced to the peripheral electrode 311 is reduced, and the occurrence of the above-described burn-in is suppressed.

4. Fourth Embodiment

As an electronic apparatus according to this embodiment, a projection-type display apparatus 1000 is exemplified.

Figure 8:
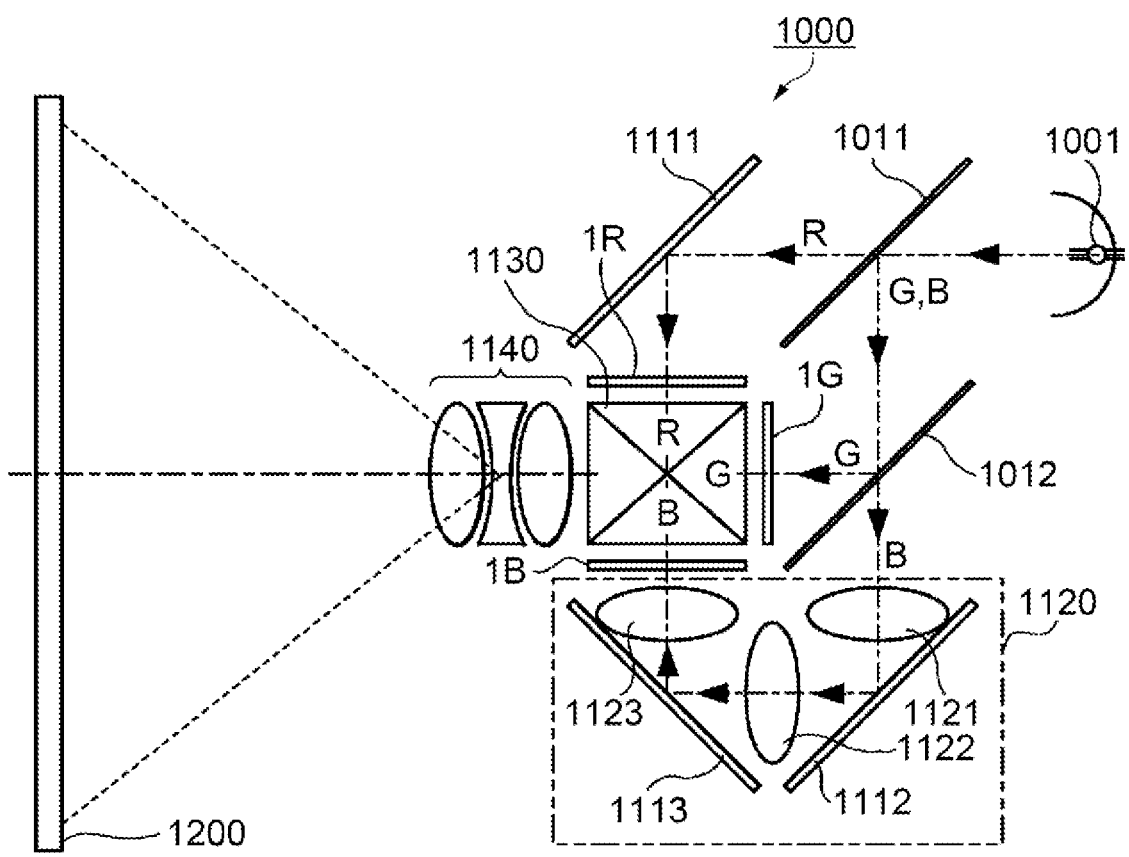
FIG. 8 is schematic view illustrating a configuration of a projection-type display apparatus as an electronic apparatus according to a fourth embodiment.

As illustrated in FIG. 8, the projection-type display apparatus 1000 includes a lamp unit 1001, dichroic mirrors 1011 and 1012, three liquid crystal apparatuses 1B, 1G and 1R, reflection mirrors 1111, 1112 and 1113, relay lenses 1121, 1122 and 1123 of color separation optical systems, and a dichroic prism 1130 and a projection optical system projection lens 1140 of color synthesize optical systems.

The lamp unit 1001 is, for example, an electrostatic discharge type light source. The type of the light source is not limited to this, and a solid light source such as a light-emitting diode and a laser may also be employed.

Light emitted from the lamp unit 1001 is separated by the dichroic mirrors 1011 and 1012 into color light of three colors of different wavelength ranges. The color light of three colors is substantially red red light R, substantially green green light G, and substantially blue blue light B.

The dichroic mirror 1011 transmits the red light R, and reflects the green light G and the blue light B with shorter wavelengths than the red light R. The red light R transmitted through the dichroic mirror 1011 is reflected by the reflection mirror 1111, and impinges on the liquid crystal apparatus 1R. The green light G reflected by the dichroic mirror 1011 is reflected by dichroic mirror 1012, and then impinges on the liquid crystal apparatus 1G. The blue light B reflected by the dichroic mirror 1011 is transmitted through the dichroic mirror 1012, and impinges on a relay lens system 1120.

The relay lens system 1120 includes the relay lenses 1121, 1122 and 1123, and the reflection mirrors 1112 and 1113. The blue light B has a longer light path in comparison with the green light G and the red light R, and as such tends to have a large light flux. Therefore, the increase of the light flux is suppressed using the relay lens 1122. The blue light B incident on the relay lens system 1120 is reflected by the reflection mirror 1112 while being converged at the relay lens 1121, and is then converged in the vicinity of the relay lens 1122. Then, the blue light B impinges on the liquid crystal apparatus 1B through the reflection mirror 1113 and the relay lens 1123.

The liquid crystal apparatus as the electrooptic apparatus of the above-described embodiments is applied to the liquid crystal apparatuses 1R, 1G and 1B, which are light modulation apparatuses, in the projection-type display apparatus 1000. Preferably, the liquid crystal apparatus of the above-described embodiment is applied to one or more of the liquid crystal apparatuses 1R, 1G and 1B, more preferably to all of the liquid crystal apparatuses 1R, 1G and 1B.

Each of the liquid crystal apparatuses 1R, 1G and 1B is electrically coupled to a higher-level circuit of the projection-type display apparatus 1000. As such, when image signals for specifying the gradation levels of the red light R, the green light G, and the blue light B are supplied from the external circuit to the higher-level circuit and are processed, the liquid crystal apparatuses 1R, 1G and 1B are driven and each color light is modulated.

The red light R, the green light G, and the blue light B modulated at the liquid crystal apparatuses 1R, 1G and 1B impinge on the dichroic prism 1130 from three directions. The dichroic prism 1130 combines the red light R, the green light G, and the blue light B incident on it. At the dichroic prism 1130, the red light R and the blue light B are reflected at 90 degrees, and the green light G is transmitted. In this manner, the red light R, the green light G, and the blue light B are combined as display light for displaying a color image, and impinge on the projection lens 1140.

The projection lens 1140 is disposed to face the outside of the projection-type display apparatus 1000. The display light is emitted in an enlarged manner through the projection lens 1140, and a projection image is projected on a screen 1200, which is a projection object.

In this embodiment, the contact angle with respect to water of the surface that faces the liquid crystal layer 50 at the orientation films 18 and 22 is set to 50 degrees or greater through the above-described surface treatment, but this is not limitative. The contact angle obtained through the surface treatment may be 30 degrees to 40 degrees, and may be approximately 20 degrees depending on the surface treatment.

In this embodiment, the projection-type display apparatus 1000 is exemplified as an electronic apparatus, but this is not limitative. The electrooptic apparatus of the present disclosure is applicable to electronic apparatuses such as a projection type head-up display (HUD), a direct-view head mounted display (HMD), a personal computer, a digital camera, and a liquid crystal television, for example.

According to this embodiment, the diffusion of ionic impurities in the liquid crystal layer 50 is suppressed and the display quality of the liquid crystal apparatuses 1R, 1G and 1B is improved. Thus, it is possible to provide the projection-type display apparatus 1000 that is excellent in the quality of projection images.

What is claimed is:

1. An electrooptic apparatus comprising:
    a first pixel electrode provided in a display region; and
    a second pixel electrode, a transistor provided corresponding to the second pixel electrode, and a circuit separated from the transistor, the second pixel electrode, the transistor and the circuit being provided outside the display region,
    wherein the second pixel electrode overlaps the circuit in plan view,
    wherein the second pixel electrode comprises:
        a first electrode disposed adjacent to the display region;
        a second electrode disposed on a first side of the first electrode in a first direction, and is greater in length in the first direction than the first electrode; and
        a third electrode disposed on a second side of the first electrode in a second direction intersecting the first direction, and is greater in length in the second direction than the first electrode.

2. The electrooptic apparatus according to claim 1, comprising a peripheral electrode provided outside a region where the second pixel electrode is provided.

3. The electrooptic apparatus according to claim 2, wherein the first pixel electrode, the second pixel electrode, and the peripheral electrode are provided at a same layer, and include a same material.

4. The electrooptic apparatus according to claim 2, wherein in plan view, a width of the second pixel electrode between an inner periphery edge of the second pixel electrode and an outer periphery edge of the second pixel electrode is greater than a width of the peripheral electrode between an inner periphery edge of the peripheral electrode and an outer periphery edge of the peripheral electrode.

5. The electrooptic apparatus according to claim 1, comprising:
    a liquid crystal layer; and
    an orientation film, wherein
    the orientation film includes a first vapor deposition film, and a second vapor deposition film provided between the first vapor deposition film and the liquid crystal layer, and
    the second vapor deposition film is provided with an organopolysiloxane film.

6. The electrooptic apparatus according to claim 5, wherein a contact angle of the orientation film with respect to water is 50 degrees or greater.

7. The electrooptic apparatus according to claim 6, wherein the contact angle is from 60 degrees to 90 degrees.

8. The electrooptic apparatus according to claim 1, comprising a sealing material, wherein
    the second pixel electrode is provided at a corner of a region between the display region and the sealing material in plan view, and is electrically coupled to a plurality of transistors.

9. The electrooptic apparatus according to claim 8, wherein the plurality of transistors are adjacent to each other in a direction in which a scan line extends.

10. The electrooptic apparatus according to claim 2, wherein the peripheral electrode includes a plurality of protruding parts protruding along the second pixel electrode and toward the region where the second pixel electrode is provided.

11. An electronic apparatus comprising the electrooptic apparatus according to claim 1.

\* \* \* \* \*